Figure 3:
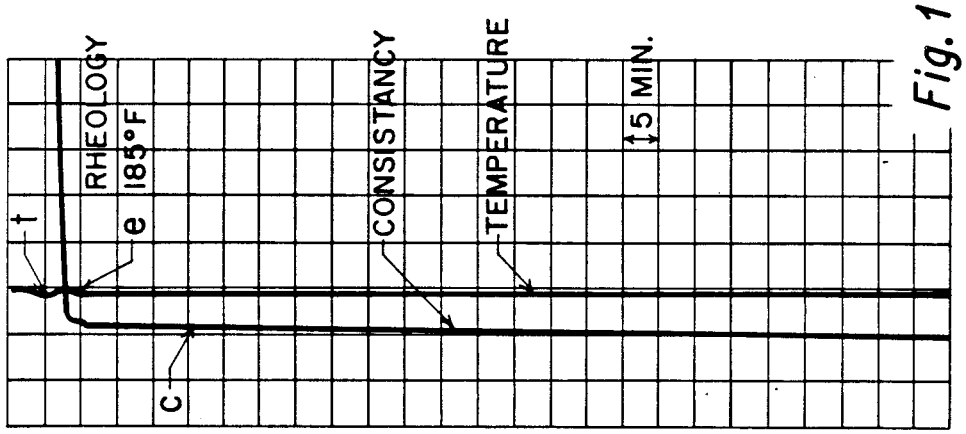

United States Patent [19]

Parcevaux et al.

[11] Patent Number: 4,767,460
[45] Date of Patent: Aug. 30, 1988

[54] CEMENT COMPOSITIONS FOR CEMENTING OF WELLS ENABLING GAS CHANNELLING IN THE CEMENTED ANNULUS TO BE INHIBITED BY RIGHT-ANGLE SETTING

[75] Inventors: P. Parcevaux, St. Etienne; B. Piot, Clamart, both of France; P. Sault, Beverwijk, Netherlands

[73] Assignee: Dowell Schlumberger Incorporated, Tulsa, Okla.

[21] Appl. No.: 820,487

[22] Filed: Jan. 17, 1986

[30] Foreign Application Priority Data

Jan. 29, 1985 [FR] France ................................ 85 01393

[51] Int. Cl.⁴ ........................ C04B 24/20; E21B 33/13
[52] U.S. Cl. ........................................ 106/90; 106/315; 524/6; 523/130; 166/293
[58] Field of Search .................... 106/90, 315, 314; 523/130; 524/6; 166/293

[56] References Cited

U.S. PATENT DOCUMENTS

| | | | |
|---|---|---|---|
| 4,486,562 | 12/1984 | Fischer et al. | 524/572 |
| 4,537,918 | 8/1985 | Parcevaux et al. | 166/293 |

FOREIGN PATENT DOCUMENTS

| | | | |
|---|---|---|---|
| 2524460 | 10/1983 | France . | |
| 50-3336 | 2/1975 | Japan | 106/90 |
| 56-59661 | 5/1981 | Japan | 106/90 |
| 60-42260 | 3/1985 | Japan | 106/314 |

Primary Examiner—Steven Capella
Attorney, Agent, or Firm—Stephen A. Littlefield

[57] ABSTRACT

The cement compositions according to the invention are designed for cementing wells, in particular oil and gas or geothermal wells, and for withstanding very high temperatures.

A combination of styrene-butadiene latex and a polyoxyethylenated nonylphenol stabilizer of this latex is provided. Cement sets at a right angle and gas migration in the annulus is prevented.

8 Claims, 1 Drawing Sheet

CEMENT COMPOSITIONS FOR CEMENTING OF WELLS ENABLING GAS CHANNELLING IN THE CEMENTED ANNULUS TO BE INHIBITED BY RIGHT-ANGLE SETTING

This invention relates to cement compositions for cementing wells, in particular oil or geothermal wells, the components whereof form an original combination and prevent the occurrence of the phenomenon known as "gas-channelling" as soon as it appears by a special manner of cement setting termed "right-angle-set".

The notion of gas-channelling, ie. when compressed gas migrates within the cemented annulus, is very familiar to professionals in the field of oil well cementing.

It need only be remembered here that such migration of the gas takes place after the cement slurry has been injected into the annular space between the drilled formations and the well casing, when the well traverses a pocket of compressed gas.

The phenomenon occurs during setting of the cement, from the time when setting has progressed enough for the hydrostatic pressure to no longer be transmitted, or to no longer be sufficiently transmitted through the cement, but not enough for the cement at the level of the gas pocket to oppose migration of the gas into the setting cement under the pressure from the gas pocket which at this point is no longer balanced by the hydrostatic pressure.

The pressurized gas then migrates through the cement in the course of its setting and/or between the cement and the drilled formations, creating a multiplicity of channels in the cement, which channels may reach up to the surface of the well.

Gas channelling can be exacerbated by the cement's shrinkage and possibly by liquid losses from the cement slurry through filtration into the surrounding earth, especially in the area of porous formations, also termed "fluid loss".

Gas channelling is thus a serious drawback leading to weakening of the cement and to safety problems on the surface.

The number of attempts which have been made to solve this problem is in keeping with its severity and with the major concern of oilmen concerning it for many years.

An efficient solution has been proposed in French patent application Nos. 82-05983 (Apr. 6, 1982) and 83-01031 (Jan. 24, 1983).

Both of these specifications describe the use of cement slurries containing a styrene-butadiene latex, a latex stabilizer and, for the most elevated temperatures, a silica flour.

The present invention is directed to improving the properties of compositions of the same type even further and making them still easier to use in the field.

It has been discovered in accordance with the invention that cement slurries basically comprised of the following components:
  cement,
  water,
  an alkylphenol polyoxyethylene type of surface-active agent,
  styrene-butadiene latex (optionally),
  and silica flour (optionally),
(in which the latex and the surfactant answer to specific requirements that will be explained later herein) exhibit a unique property known as "right-angle-set".

This property is illustrated by the fact that, in setting, the slurry skips the intermediate phase described in the above-mentioned patent specifications. In fact the slurry goes directly from the state where hydrostatic pressure is correctly transmitted by the slurry column to that where the cement's setting effectively oppose gas migration into the annulus.

The compositions described in greater detail hereinafter thus provide a radical solution to the problem of gas channelling.

Said unique "right-angle-set" property can be obtained only with very specific compositions of cement slurry.

Indeed it has been observed that only the introduction into the slurry of a specific surfactant—ammonium salt of sulfated nonylphenoxy poly (ethyleneoxy) ethanol—containing 10-30 moles of ethylene oxide (EO) yielded this property.

It is otherwise known that, as concerns the cementing of oil wells and other wells, the cement slurry must exhibit a set of difficult-to-combine properties (rheology, fluid loss control, free water content, setting time, etc.).

This result is achieved in the present invention by associating with the above-mentioned surfactant a latex which is itself highly specific, namely a styrene-butadiene latex (SBR) with styrene and butadiene units ranging from 70/30 to 40/60 in the weight ratio.

The above-mentioned latexes in fact proved very effective in terms of fluid loss control.

In addition, a very good salt tolerance was also observed in connection with the above-mentioned specific surfactant. This is an important property since the wells may be contaminated by magnesium or sodium salts, among others, and since it would be extremely worthwhile in an offshore drilling context to use seawater as the mixing water for the slurry.

Said SBR latexes thus contribute to a remarkable set of properties when employed in combination with the previously-mentioned surfactant: ammonium salt of sulfated nonylphenoxy poly (ethyleneoxy) ethanol.

The invention thus concerns the said surfactant's capability to contribute said "right-angle-set" property to a cement slurry, which slurry may or may not include a latex, and the specific combination of said surfactant with an SBR latex to obtain a remarkable set of properties required for correct cementing of wells.

The slurry may also include silica flour, the worthwhile feature whereof is to enable cementing to be carried out at high bottomhole static temperatures, on the order of more than 250° F. (120° C.).

The cement itself can be taken from any class of common hydraulic cements routinely used to cement oil wells.

The term "hydraulic cement" is used to designate cements which contain compounds of calcium, aluminum, silicon, oxygen and/or sulfur and which set and harden by reaction with water. These include those cements commonly called "Portland cements", such as normal Portland or rapid-hardening or extra-rapid-hardening Portland cement, or sulfate-resisting cement and other modified Portland cements; cements commonly known as high-alumina cements, high-alumina calcium-aluminate cements; and the same cements further containing small quantities of accelerators or retarders or air-entraining agents, as well as Portland cements containing secondary constituents such as fly ash, pozzolan and the like.

Conventional admixtures can be used in the usual quantities (including anti-foaming agents, retarders and so on).

Several preferred embodiments of the invention will now be described which should not be construed as limiting the scope of the invention.

Right-angle-set and gas migration inhibiting property

The extent of these properties is established in Tables I through IV hereinafter.

In Tables II and III:

DP=0: stands for the instant when pore pressure begins to drop.

DP=5: stands for the time for which the cement's pore pressure has dropped by 5% due to the start of setting.

"setting time": means the time which has elapsed before complete setting. This time is determined in terms of the maximum temperature reached in the cement.

Setting is more "at a right angle" the closer together the values for "DP=5%" and "setting time".

Test 1016 (Table III) corresponds to a strictly "right-angle" set.

Table IV shows that:

the lack of both the latex and the above-mentioned surfactant leads to a very poor result in terms of controlling gas channelling (test 1018).

tests 1019 (latex+surfactant) and 1020 (surfactant but no latex) establish the absence of gas migration and the role of the previously-mentioned surfactant in this matter.

In these Figures, the vertical axis is in units of time while, with respect to the consistency curve, the horizontal axis is in units of relative cement consistency in accordance with the above API standard and, with respect to the temperature curve, is in units of degrees Farenheit.

Tables II and III confirm these observations.

The examples collected in Tables I to IV, and in particular tests 3 of Table I, 1013 of Table II, 1016 of Table III and 1020 of Table IV, show that the proportions to be used are substantially as follows (by weight and specifically by weight of cement—BWOC—where appropriate):

latex (%BWOC): 5-30, but the concentration of latex is directly related to the temperature of application, namely preferably:

5-10% for a temperature of 86° F. (30° C.), 10-15% for an application temperature of 122[F. (50° C.), 15-20% for an application temperature of 185[F. (85° C.), 20-25% for an application temperature of 212[F. (100° C.);

stabilizer (%BW of latex): 3-20 and preferably 3-15 (especially sodium salt of condensation product of sulfonic naphtalene acid and formaldehyde);

retarder (%BWOC, optional): 0.05-2, depending on temperature;

anti-foaming agent (Qty BWOC, optional): 4-6 cm$^3$/kg;

water content: preferably on the order of 44%, minus the volume of liquid additives;

surfactant (as described): 3 to 5% by volume of latex. (When the slurry does not include any latex, the concentration of the above-mentioned surfactant can be between 0.5 and 2% BWOC).

Figure 2:
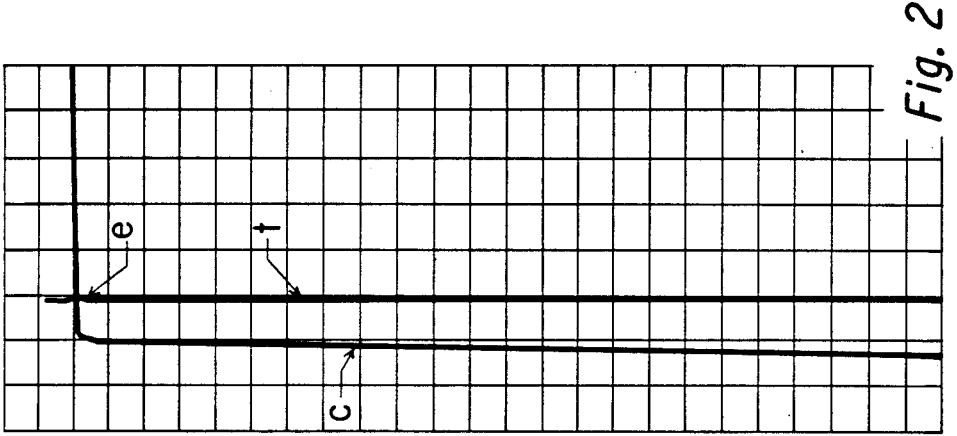
Figure 1:
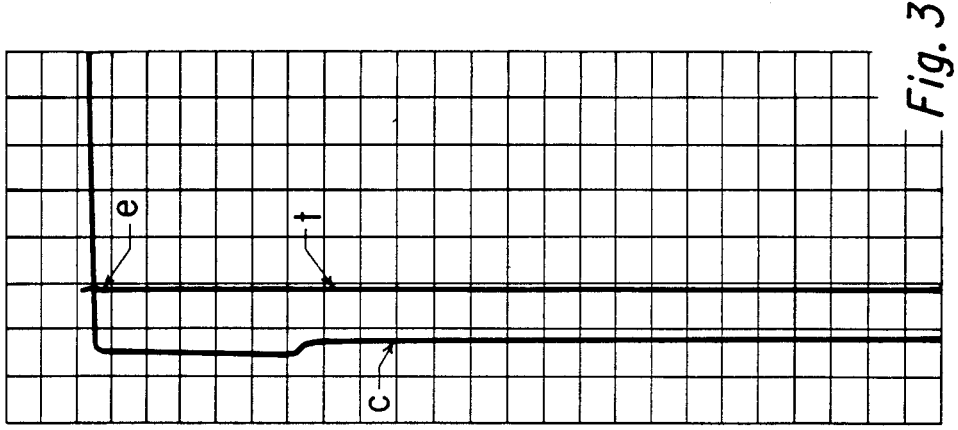

FIGS. 1, 2 and 3 appended hereto give three examples of right-angle-set.

The associated tests were carried out with a consistometer pressurized as per the procedure outlined in API standard 10, Appendix F.

In these figures:
c=consistency curve
t=temperature curve
e=exothermal shoulder.

The consistency curve clearly shows the right-angle-set and the exothermal shoulder corresponding to the setting of the cement.

The test conditions were as follows:

FIG. 1

| Norcem cement, API Class C | |
|---|---|
| Cell No. 1 | |
| Bottomhole Circulation Temp. (BHCT): | 290° F. (143° C.) |
| Bottomhole Pressure (BHP): | 18,800 psi |
| I.P.: | 2,000 psi |
| Rate of heating: | 6.3°/min. |

Composition

| Cement | |
|---|---|
| Lignosulfonate dispersant | 0.8% BWOC |
| Glucosulfonate retarder | 0.05% BWOC |
| SBR Latex | |
| "FENOPON" 4% | } 310.8 l/t (metric) |
| 3% polyglycol 2000 | |
| Silica flour | 35% BWOC |
| Weighting agent (baryte) | 35% BWOC |
| Antifoam agent (polyglycol 4000) | 4.44 l/t (metric) |
| Mix water (fresh water) | 63% by volume minus the volume of liquid additives |

Result: set in 3 h 40 min. (consistency 100 Bc)

FIG. 2

| Norcem cement, C 844 | |
|---|---|
| Cell No. 1 | |
| BHCT: | 290° F. (143° C.) |
| BHP: | 18,800 psi |
| I.P.: | 2,000 psi |
| Rate of heating: | 6.3°/min. |

Composition

| Cement | |
|---|---|
| Lignosulfonate dispersant | 1.1% BWOC |
| SBR Latex | |
| "FENOPON" 4% | } 310.8 l/t (metric) |
| 3% polyglycol 2000 | |
| Weighting agent (baryte) | 35% BWOC |
| Silica flour | 35% BWOC |
| Antifoam agent (Polyglycol 4000) | 4.44 l/t (Metric) |
| Mix water (fresh water) | 63% by volume minus the volume of liquid additives |

Result: 4 h set (consistency 100 Bc)

FIG. 3

| Norcem cement, C 844 | |
|---|---|
| Cell No. 1 | |
| BHCT: | 290° F. (143° C.) |
| BHP: | 18,800 psi |
| I.P.: | 2,000 psi |
| Rate of heating: | 6.3°/min. |

Composition

| Cement | |
|---|---|
| Lignosulfonate dispersant | 0.8% BWOC |
| Glucoheptonate retarder | 1.77 l/t |
| SBR Latex | |
| "FENOPON" 4% | 310.8 l/t |
| 3% polyglycol 2000 | |
| Weighting agent (baryte) | 35% BWOC |
| Silica flour | 35% BWOC |
| Antifoam agent (Polyglycol 4000) | 4.44 l/t (metric) |
| Mix water (fresh water) | 63% by volume minus the volume of liquid additives |

Result: 5 h set (consistency 100 Bc)

TABLE I

| CEMENT | TEST 1 DYCKG | TEST 2 DYCKG | TEST 3 DYCKG |
|---|---|---|---|
| $CaCl_2$ (% BWOC) | | 1 | 1 |
| N0 (% BWOC) | | | 1 |
| Latex A (l/t) | 151 | 151 | 151 |
| Stab. (l/t) | 5.33 | 5.33 | 5.33 |
| AFA (l/t) | 4.44 | 4.44 | 4.44 |
| E.F (% VLA) | 44 | 44 | 44 |
| BHCT (°F.) | 100 | 100 | 100 |
| Thickening time (pumpability time) h. min | 7.25 | 2.12 gel | 2.30 right-angle set |

N.B. See after Table IV for explanations on Tables I through IV.

TABLE II

| Test No | 1001 | 1009 | 1010 | 1014 | 1013 |
|---|---|---|---|---|---|
| SLURRY: | | | | | |
| DYCK G GULF | (739) | | (841) | (841) | (841) |
| Lat B (l/t) | 151 | 151 | 151 | 151 | |
| N0 (% V Lat.) | | | 3.6 | 3.6 | 3.6 |
| AG (% V Lat.) | | | | 3 | |
| Stab. (l/t) | 2.66 | 3.10 | 3.55 | 3.55 | 3.55 |
| R (l/t) | 1.33 | 1.78 | 1.78 | 1.78 | 1.78 |
| AFA (l/t) | 4.44 | 4.44 | 4.44 | 4.44 | 4.44 |
| FW (l/t) | 44 | 44 | 44 | 44 | 44 |
| TEST TEMP. (°F.) | 158 | 158 | 158 | 158 | 158 |
| D.P = 0 (min) | 160 | 235 | 275 | 245 | 205 |
| D.P = 5% (min) | 175 | 245 | 320 | 255 | 290 |
| Setting time (min) | 240 | 310 | 340 | 320 | 325 |
| Gas transit time in column (min) | nil | nil | nil | nil | infinite |
| Initial gas migration (cc/min) | 900 | nil | 12 | nil | nil |
| Final gas migration (cc/min) | 900 | 2170 | 12 | 45 | nil |
| Migration = 100 cc/min (min) | | 80 | | | |

N.B. see after Table IV for explanations on Tables I through IV.

TABLE III

| Test No | 1007 | 1008 | 1011 | 1015 | 1016 | 1017 |
|---|---|---|---|---|---|---|
| SLURRY | | | | | | |
| CEMOIL G 179 | | | | | | |
| Latex B (l/t) | 151* | 151 | 151 | 151 | | |
| N0 (% V Lat) | | | 3.6 | 3.6 | 3.6 | |
| AG (% V Lat) | | | | 3 | | |
| Stab. (l/t) | 8.8 | 8.8 | 8.8 | 8.8 | 8.8 | 8.8 |
| R (l/t) | 1.78 | 1.78 | 1.78 | 1.78 | 1.78 | 1.78 |
| AFA (l/t) | 4.44 | 4.44 | 4.44 | 4.44 | 2.66 | 2.66 |
| FW (% VLA) | 44 | 44 | 44 | 44 | 44 | 44 |
| TEST TEMP. (°F.) | 158 | 158 | 158 | 158 | 158 | 158 |
| D.P = 0 (min) | 300 | 240 | 270 | 270 | 315 | 215 |
| D.P = 5% (min) | 410 | 310 | 305 | 300 | 380 | 360 |
| Setting time (min) | 435 | 375 | 360 | 350 | 380 | 505 |
| Gas transit time in column (min) | infinite | nil | 90 | 80 | infinite | nil |
| Initial gas migration (cc/min) | nil | 2670 | | | nil | 2500+ |
| Final gas migration (cc/min) | nil | 2670 | 19 | 2.5 | nil | 5000+ |
| Migration = 100 cc/min (min) | | | | | | |

*Latex A instead of latex B.
N.B. See after Table IV for explanations on Tables I through IV.

TABLE IV

| Test No | 1018 | 1019 | 1020 |
|---|---|---|---|
| SLURRY: | DYCKG 841 | DYCKG 841 | DYCKG 841 |
| Latex A (l/t) | | 151 | |
| N0 (% BWOC) | | 1.0 | 1.0 |
| Stab. (l/t) | 4 | 3.55 | 3.55 |
| R (l/t) | 1.78 | 1.78 | 1.78 |
| AFA (l/t) | 4.44 | 4.44 | 4.44 |
| Mix water (NaCl 18%) - VLA | 47.4 | 47.4 | 47.4 |
| Test temp. (°F.) | 158 | 158 | 158 |
| DP = 0 (min) | 270 | 380 | |
| DP = 5% (min) | 325 | 455 | 340 |
| Setting time (min) | 370 | 510 | 365 |
| Initial gas migration (standard cc/min) | 20 | nil | nil |
| Gas transit time in column (min) | nil | infinite | infinite |
| Maximum gas migration (standard cc/min) | 70 | nil | nil |
| Yield value (YV) Pa) | | 10.63 | 7.85 |
| Plastic viscosity (cp) | | 30.4 | 18.6 |

N.B. See below for explanations on Tables I through IV.

KEY TO TABLES I-IV

| | |
|---|---|
| $CaCl_2$ | acts as a setting accelerator in the presence of N0. |
| "DYCKG" | DYCKERHOFF cement, API class G |
| "DYCK G GULF" | Tropicalized variant of DYCK G cement made by same manufacturer. |
| CEMOIL G 719 | API Class G cement. |
| N0 | ammonium salt of sulfated nonylphenoxy poly(ethyleneoxy) ethanol. "FENOPON EP 120", GAF, containing 20-30 moles EO. |
| Latex A | Styrene-butadiene (50/50% by weight) latex - "RHODOPAS" SB012). |
| Latex B | Styrene-butadiene (66/33% by weight) latex. |

| -continued | |
|---|---|
| KEY TO TABLES I-IV | |
| Stab. | Latex stabilizer, ie. sodium salt of the condensate of sulfonic naphthalene acid and formaldehyde. |
| AFA | Antifoam agent (Polyglycol MW 4000) |
| FW | fresh water |
| AG | anti gelling agent (Polyglycol MW 2000) |
| R | retarder, lignosulfonate type |
| % VLA | Percent, minus the volume of liquid additives |
| % V Lat. | Percent by volume related to latex content. |

What is claimed is:

1. An aqueous cement slurry composition for cementing oil, gas, and geothermal wells, comprising:
cement, water and about 0.5 to 2% by weight of cement of an ammonium salt of a sulfated nonylphenoxypoly(ethyleneoxy) ethanol to produce an aqueous cement slurry having a right-angle set property,
said right-angle set property permitting said aqueous cement slurry to go directly from a state where hydrostatic pressure of said aqueous cement slurry is transmitted by a slurry column directly to a state where gas migration is effectively prevented by setting of said cement.

2. The aqueous cement slurry composition set forth in claim 1, wherein said ammonium salt of a sulfated nonylphenoxypoly(ethyleneoxy) ethanol contains from about 10 to 30 moles of ethylene oxide.

3. The aqueous cement slurry composition of claim 1, including a styrene-butadiene latex.

4. The aqueous cement slurry composition of claim 3, wherein said styrene-butadiene latex contains styrene and butadiene units ranging from about 70/30 to 40/60 in weight ratio.

5. A method of preventing gas channelling or gas migration in an oil, gas or geothermal well annulus, comprising cementing said well annulus with an aqueous cement slurry composition as set forth in claim 1.

6. A method of preventing gas channelling or gas migration in an oil, gas or geothermal well annulus, comprising cementing said well annulus with an aqueous cement slurry composition as set forth in claim 2.

7. A method of preventing gas channelling or gas migration in an oil, gas or geothermal well annulus, comprising cementing said well annulus with an aqueous cement slurry composition as set forth in claim 3.

8. A method of preventing gas channelling or gas migration in an oil, gas or geothermal well annulus, comprising cementing said well annulus with an aqueous cement slurry composition as set forth in claim 4.

* * * * *